United States Patent Office 3,654,337
Patented Apr. 4, 1972

3,654,337
PREPARATION OF DIHYDROCARBYL CARBONATES FROM MONOALCOHOLS AND TRIHALOMETHANES
Donald M. Fenton, Anaheim, Calif., assignor to Union Oil Company of California, Los Angeles, Calif.
No Drawing. Filed Aug. 17, 1970, Ser. No. 64,555
Int. Cl. C07c 69/00
U.S. Cl. 260—463                                      10 Claims

ABSTRACT OF THE DISCLOSURE

A method for the preparation of dihydrocarbyl carbonates from a trihalomethane is disclosed. In the process, a trihalomethane is contacted with a saturated aliphatic or alicyclic monoalcohol having from 1 to 20 carbon atoms in the presence of mercuric oxide or a mercuric salt and water at a temperature of from 0° to about 250° C. and a pressure sufficient to maintain liquid phase conditions to oxidize the trihalomethane to the dihydrocarbyl carbonate.

DESCRIPTION OF THE INVENTION

This invention relates to a method of forming dihydrocarbyl carbonates and more particularly to a method of preparing dihydrocarbyl carbonates from monoalcohols and trihalomethanes.

Recently, dihydrocarbyl carbonates, and especially diethyl carbonate, have been in increasing demand by the process industries. This demand has been stimulated, in part, by the increased employment of these carbonates as solvents, particularly for solutes, such as, nitrocellulose, cellulose ethers and natural and synthetic resins. The carbonates are also used as radio tube cathode fixing lacquers and as intermediates in synthesizing many organic compounds.

Commonly, dihydrocarbyl carbonates are prepared from the reaction of phosgene with an excess of an aliphatic monoalcohol. The presence and required handling of highly toxic phosgene for the carbonate production renders the process extremely hazardous and stringent safety procedures are required. In addition, governmental regulations as to the transportation of phosgene renders the material a relatively expensive starting material for the synthesis reaction. A need therefore exists for a method of producing dihydrocarbyl carbonates from reactants less toxic than phosgene, that does not require stringent safety procedures and that produces the carbonate products in good yields.

It is therefore an object of this invention to provide a method of producing dihydrocarbyl carbonates.

It is another object of this invention to produce dihydrocarbyl carbonates from reactants of low toxicity.

Other and related objects of this invention will be apparent to those skilled in the art from the description thereof which follows.

The aforementioned objects and their attendant advantages can be attained by contacting a saturated aliphatic or alicyclic monoalcohol having from 1 to 20 carbons with a trihalomethane in the presence of mercuric oxide or an aqueous solution containing a mercuric salt. The contacting is conducted in the liquid phase at a temperature of from about 0° to 250° C. and a pressure sufficient to maintain liquid phase conditions. When mercuric oxide is used, the reaction proceeds according to the following equation:

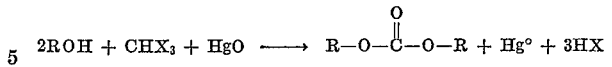

wherein X represents chlorine or bromine.

When a mercuric salt is selected, water is a coreactant and the reaction proceeds according to the following equation:

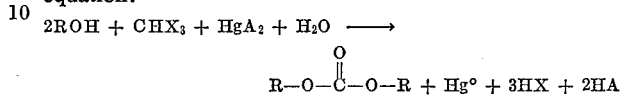

wherein A represents the anionic component of the mercury salt.

As can be seen from either of the above equations, the mercuric oxide or salt is reduced in valence during the oxidation reaction and the trihalomethane reactant is oxidized and condensed with the monoalcohols. The oxygen for the carbonate is obtained from mercuric oxide as illustrated in the first equation or from water as illustrated in the second equation.

The reactant alcohol of this invention comprises a saturated aliphatic or alicyclic monohydroxyl alcohol having from 1 to about 20 carbon atoms, preferably from 1 to about 10 carbon atoms and more preferably from 1 to about 4 carbon atoms. Exemplary saturated aliphatic monoalcohols include methanol, ethanol, propanol, isopropanol, n-butanol, sec-butanol, t-butanol, pentanol-3, n-hexanol, heptanol-4, 2-ethylhexanol, octanol-2, 5-butyldodecanol-3, n-octadecanol, 4-isobutyl-5-ethyldodecanol-2, etc. The preferred aliphatic monoalcohols are methanol, ethanol, n-propanol and n-butanol and more preferably ethanol. The saturated alicyclic monohydroxy alcohols include those having from 3 to about 12 ring carbons and having from 3 to about 20 carbons, preferably from 5 to about 10 carbons. Examples are: cyclopropanol, cyclobutanol, methylcyclopentanol, cyclohexanol, cycloheptanol, 3 - ethylcyclohexanol - 1, 2,5 - diethylcyclohexanol, 2-cyclohexylbutanol-1, cycloundecanol, cyclododecanol, octylcyclododecanol, etc.

The reactant trihalomethane can be tribromo or trichloro methane or trihalo mixtures thereof such as, bromodichloro and chlorodibromomethane.

The reaction is conducted in the presence of an oxygen source and a mercury compound wherein the mercury is in an oxidized or high valent state. In one embodiment mercuric oxide is used which operates as an oxygen source for the oxidation reaction and also provides the high valent mercuric ion to the reaction medium. Other mercury compounds and oxygen sources can be employed and in another embodiment the reaction is catalyzed by an aqueous solution containing a mercuric salt. The mercuric salt supplies the reaction with the oxidant, i.e., mercuric ion, and the water supplies the reaction with available oxygen. Exemplary mercury salts include mercuric nitrate, mercuric carbonate, mercuric perchlorate, mercuric sulfate and mercuric carboxylate having from 1 to 5 carbons, such as, mercuric acetate, mercuric propionate, mercuric butyrate, mercuric valerate, etc. Preferred mercury catalysts are mercuric salts which are soluble in water, such as, mercuric acetate, mercuric nitrate, etc.

The amount of mercuric compound present in the reaction medium in solution or as a suspension generally ranges from 0.01 to 50 weight percent and preferably 1 to 35 weight percent of the reaction medium; however, any amount of the compound can be employed since the amount of compound present in the reaction medium only effects the total amount of dihydrocarbyl carbonate produced.

The reaction is performed under liquid phase conditions and can be conducted in the presence of a suitable liquid solvent which is preferably a solvent for the reactants and the mercuric compound and inert thereto under the reaction conditions. A high solubility of the mercuric compound in the solvent isn't necessary and even relatively insoluble mercuric oxide can be used. The mercuric compound can be slurried in the reaction medium and functions to supply the mercuric ion to the solution as the solution is depleted of mercuric ion by the oxidation. Suitable liquids include alkanes and cycloalkanes having from 5 to 10 carbons, such as, pentane, hexane, cyclohexane, octane, decane, etc.

The reaction can also be conducted in the absence of the above solvents by conducting the reaction in an excess of the reactant alcohol, such as, from 2 to 100 times that stoichiometrically required for the reaction. This can be accomplished for example, in the batch process by adding a stoichiometric excess of alcohol to the reaction vessel or by terminating the reaction prior to the consumption of the alcohol reactant, and in the continuous process by continuously adding sufficient alcohol to maintain the desired level. In another embodiment, the reaction can be conducted in a stoichiometric excess of both the alcoholic and trihalomethane reactants. In this embodiment the reaction is controlled by manipulating the amount of mercuric catalyst present in the contacting zone.

The reaction may be performed at moderate reaction conditions, such as, temperatures of from 0° to about 250° C. and preferably from 30° to about 200° C., and pressures from 1 to about 100 atmospheres and sufficient to maintain liquid phase conditions.

The reaction can be performed batchwise or in a continuous fashion. When operating batchwise the mercuric compound (including water if necessary) trihalomethane, alcohol and solvent, if one is employed, are introduced into the reaction zone under sufficient pressure to maintain the various ingredients in liquid phase and are heated to the desired reaction temperature. The liquid product containing the dihydrocarbyl carbonate and mercury metal can be removed from the reaction zone during the oxidation reaction by withdrawing a stream of the liquid reaction medium and subjecting the same to conventional separation procedures, i.e., the mercury metal can be removed by centrifuge and separated from the unreacted reactants and product carbonates by distillation. Any unreacted reactants can then be recycled to the reaction medium and the mercury metal can be re-oxidized to a higher valent state and then recycled. In this manner, the mercuric compound functions as a catalyst and a small amount of mercuric catalyst can be employed while realizing a substantial conversion to the dihydrocarbyl carbonate product.

When operating in a continuous fashion, the catalyst (including water if necessary), trihalomethane, alcohol and solvent, if one is employed, are introduced into a concurrent or countercurrent contacting zone and the effluent continuously processed to recover the product carbonate and spent catalyst (mercury metal). The unreacted reactants and active catalyst can then be recycled and the spent catalyst can be regenerated and thereafter recycled to form a closed process with only the reactants being the necessary raw materials.

The following examples are presented to illustrate the results obtainable in the practice of specific embodiments of this invention, but they are not to be construed as limiting the scope of the invention as defined by the appending claims.

Example 1

This example illustrates the preparation of dibutyl carbonate from chloroform in the presence of mercuric oxide. A 300 milliliter titanium autoclave is charged with 25 milliliters of chloroform, 40 grams of yellow mercuric oxide and 100 milliliters of n-butanol. The autoclave is closed and the contents are heated to a temperature of 40° C. and maintained at that temperature for 2 hours, then heated to a temperature of 110° C. and maintained at that temperature for 2 hours, and finally heated to and maintained at 180° C. for an additional 2 hours. At the end of the total 6-hour contacting period the autoclave pressure increases to 30 p.s.i.g. The autoclave is then cooled and depressured and the contents are filtered. The recovered filtrate is then subjected to distillation and dibutyl carbonate is recovered. The presence of dibutyl carbonate is confirmed by infrared spectroscopy.

Example 2

This example demonstrates the preparation of dibutyl carbonate from chloroform in the presence of a mercuric salt and water. A 300 milliliter titanium autoclave is charged with 50 milliliters of chloroform, 40 milliliters of n-butanaol, 20 milliliters of water and 50 grams of mercuric acetate. The autoclave is closed and the contents are heated, under rocking, to a temperature of 110° C. and maintained at that temperature for 2 hours and then heated to and maintained at a temperature of 210° C. for an additional 2 hours. The final pressure at the end of the 4-hour contacting period increases to 275 p.s.i.g. The auotoclave is then cooled to ambient conditions and depressurized, and the contents are filtered. The recovered filtrate is then subjected to distillation to recover dibutyl carbonate. The presence of dibutyl carbonate is confirmed by infrared spectroscopy.

Example 3

The procedure as illustrated in Example 1 is repeated except that ethanol is employed rather than n-butanol. The recovered product is diethyl carbonate.

Example 4

The procedure as illustrated in Example 2 is repeated except that ethanol and bromoform are employed instead of n-butyl alcohol and chloroform. The recovered product is diethyl carbonate.

The preceding examples are intended solely to illustrate the practice of the invention and are not to be construed as unduly limiting thereof.

I claim:

1. The method of preparing dihydrocarbyl carbonates from trihalomethane which comprises contacting trihalomethane wherein the halo component is chlorine or bromine or mixtures thereof with a saturated aliphatic or alicyclic monoalcohol having from 1 to 20 carbons in the presence of mercuric oxide or water and a mercuric salt selected from the group consisting of mercuric nitrate, carbonate, perchlorate, sulfate and carboxylate having from 1 to 5 carbons at reaction conditions comprising a pressure sufficient to maintain liquid phase conditions and at a temperature of about 0° to 250° C., to oxidize the trihalomethane to said dihydrocarbyl carbonate.

2. The method defined in claim 1 wherein said trihalomethane is chloroform and said monoalcohol is a saturated aliphatic monoalcohol having from 1 to 6 carbon atoms.

3. The method defined in claim 1 wherain said mercuric salt is present in about equal molar quantities with said trihalomethane.

4. The method defined in claim 3 wherein an excess of said monoalcohol is present during said contacting.

5. The method defined in claim 1 wherein said contacting is conducted in the presence of mercuric oxide.

6. The method defined in claim 1 wherein said mercuric salt is a mercuric carboxylate having from 1 to 5 carbons.

7. The method defined in claim 2 wherein said monoalcohol is ethanol.

8. The method defined in claim 1 wherein said contacting is conducted in an inert solvent.

9. The method for preparing dihydrocarbyl carbonates from chloroform which comprises contacting chloroform with a molar excess of a saturated aliphatic monoalcohol having from 1 to 6 carbons in the presence of about an equal molar quantity of mercuric carboxylate having from 1 to 5 carbons and water at a condition comprising a pressure sufficient to maintain liquid phase conditions and a temperature of about 30° to 200° C., to oxidize said chloroform to said dihydrocarbyl carbonate.

10. The method defined in claim 9 wherein said monoalcohol is ethanol.

References Cited

UNITED STATES PATENTS 3,227,740  1/1966  Fenton _____ 260—463

OTHER REFERENCES

Hill et al.: J. Org. Chem. 30, pp. 411–415 (1965).

LEWIS GOTTS, Primary Examiner

D. G. RIVERS, Assistant Examiner